July 15, 1958 H. W. WILSON 2,843,350
SNAP-ACTION COUPLING
Filed Oct. 29, 1956

Inventor
Harold W. Wilson
by Roberts Cushman Grimes
Att'ys

United States Patent Office 2,843,350
Patented July 15, 1958

2,843,350

SNAP-ACTION COUPLING

Harold W. Wilson, Fairfield, Conn., assignor to Manning, Maxwell & Moore, Incorporated, Stratford, Conn., a corporation of New Jersey Application October 29, 1956, Serial No. 619,047

13 Claims. (Cl. 251—86)

This invention relates to a snap-action coupling device for uniting two parts in such a way that they are constrained normally to move as a unit in response to force which moves one of said parts in a given direction but which permits limited, relative, rotational and/or angular motion of the parts transversely of said first-named direction.

By way of specific example, but without intended limitation, the invention is of a special utility as a means for connecting a valve disc or head to a holder or other device whereby the valve is guided in lifting from its seat. Means for so connecting a valve disc to its guided holder finds specific example in the disclosure of the patent to Klafstad, No. 2,355,916, dated August 15, 1944, wherein the valve disc has a short, integral axial hub or stem part which is retained in a bore in the holder by a conventional snap-ring. However, such means for attaching the valve disc to the holder, while permitting a slight degree of freedom to the valve disc to rock into proper contact with its seat, presents substantial difficulty in the assembling of the parts and greater difficulty in separating them without damage to the parts, for instance, to replace a worn valve disc, especially when the holder is of one-piece construction, and the bore which receives the hub of the valve disc is a dead-end cavity at the inner end of a chamber designed to house the disc.

An object of the present invention is to provide a coupling useful, for instance and by way of example, for connecting a valve disc to a holder having a chamber in which the disc is housed, the coupling being capable of providing a reliable connection between the parts but so designed as to make assembly of the parts a simple and easy operation while, at the same time, permitting separation of the parts without danger of injury to the holder.

A further object is to provide a coupling which, while permitting an all desirable rocking motion of the valve disc with respect to the holder, tends resiliently to keep the disc with its axis in alignment with the axis of the bore in the holder.

A further object is to provide a coupling which may be housed in a bore in the holder which is substantially less in diameter than the valve disc, but which connects the parts reliably even though the valve disc be of substantial weight.

A further object is to provide a coupling comprising a plurality of resilient members for engagement with an element of the holder and which is capable of connecting the parts reliably, even though the valve disc be of substantial weight, but wherein the coupling is of such design as to permit ready assembly of the coupling and holder.

A further object is to provide a coupling and holder, the coupling being of substantially bell shape and having divergent, resilient fingers, and wherein the holder has a bore for the reception of the coupling, the bore having a restriction at its entrance through which the coupling may be entered while inwardly flexing its resilient fingers until the tips of said fingers have passed the restriction.

A further object is to provide a coupling and holder wherein the coupling is substantially of bell shape comprising a central or top member with resilient fingers diverging therefrom and, the holder having a bore for the reception of the coupling, the bore having a restricted entrance through which the coupling may be entered, the wall of the bore at its outer end converging inwardly toward the restriction thereby to act as a cam for flexing the fingers of the coupling inwardly as the coupling is entered into the bore.

A further object is to provide a coupling which is strong enough to support a heavy valve disc, but which is capable of substantial restriction in effective maximum diameter without taking a permanent set.

Other and further objects and advantages of the invention will be pointed out in the following and more detailed description and by reference to the accompanying drawings; wherein, Fig. 1 is a fragmentary, diagrammatic, vertical section showing a valve holder and a valve connected thereto by a coupling embodying the present invention;

Figure 1:
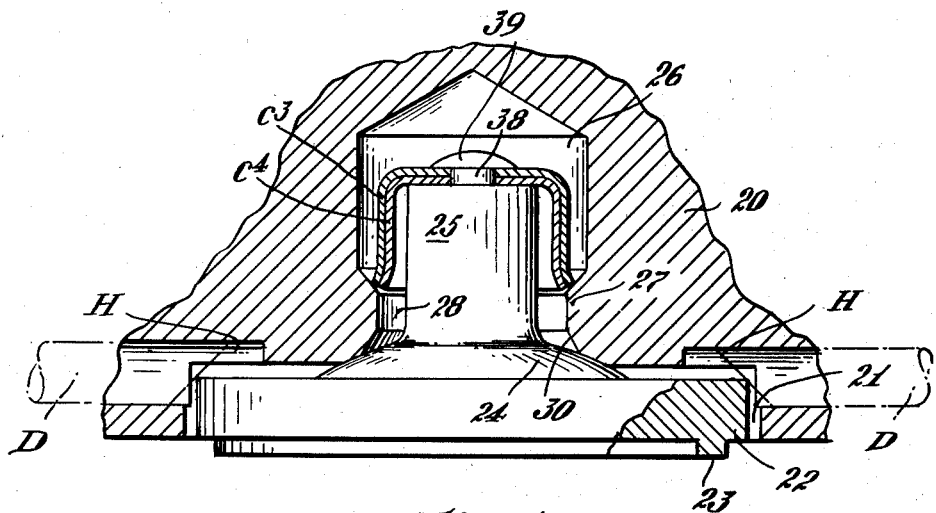

Referring to the drawings, the numeral 20 designates a valve holder similar in function to the holder designated by the numeral 10 in Fig. 1 of the Klafstad patent, above referred to. In valves of the kind in which the invention relates, the holder is usually guided to move in a rigidly rectilinear path as the valve moves toward or from its seat, the valve being so connected to the holder that the holder and valve are constrained to move as a unit as the holder moves along said path, although the connection between the holder and valve is so devised as to permit the valve to rock relatively to the holder and, desirably, to rotate about its own axis thereby to allow the valve to seat accurately upon the annular seat. Since the above construction is broadly conventional, it has not been deemed necessary to show the means for guiding the holder nor the seat with which the valve co-operates.

Figure 8:
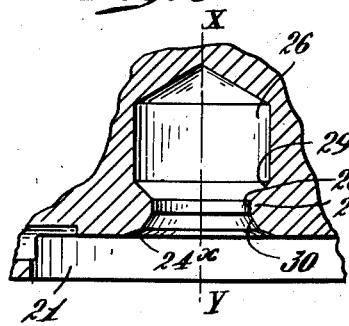
Fig. 8 is a fragmentary, diagrammatical section through the valve holder of Fig. 1, but omitting the valve and coupling; and, Figs. 9, 10 and 11 are fragmentary views illustrative of various possible shapes which may be given to the terminal portions of the legs of couplings made in accordance with the present invention.

Referring to Fig. 1, the holder is shown as so shaped as to provide a wall for a shallow, circular, cylindrical cavity 21 within which is housed the major portion of the valve disc or head 22, this disc having an annular bottom surface 23 for contact with the valve seat (not shown). As here illustrated, the valve disc is provided with an upwardly directed central boss 24 having a spherically curved upper surface designed to contact a concave spherically curved surface 24$^x$ of the holder (Fig. 8). The valve disc or head also has the integral, upwardly directed cylindrical hub or short stem 25 which extends upwardly above the spherically curved portion 24, and which is coaxial with the valve disc. When the parts are assembled (Fig. 1), this hub portion 25 is disposed in a chamber 26 within the holder and which is connected with the cavity 21 by a passage 28. The chamber 26, as here illustrated, Figs. 1 and 8 (which is permanently closed at its upper end), comprises a cylindrical main portion 26 of a diameter substantially exceeding that of the hub 25 of the valve, and which is of sufficient axial depth to accommodate the hub and the entire coupling as hereafter described. Between the main cylindrical portion of this chamber 26 and the cavity 21, the holder has a ledge or rib 27 whose central portion defines the cylindrical entrance passage 28 leading from cavity 21 into the chamber 26 of the holder, this entrance passage 28 being of substantially less diameter than the chamber 26. The rib or ledge 27 has an inner or upper sloping annular abutment surface 29 (Fig. 8) which forms a centrally apertured floor for the chamber 26 and which converges downwardly from the chamber 26 to the upper end of the passage 28. The rib or ledge 27 also has an outer or lower surface 30 which slopes outwardly and downwardly from the restricted entrance passage 28. This surface 30 constitutes a cam for a purpose hereafter described.

Figure 2:
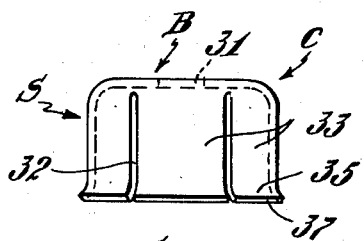
Fig. 2 is a side elevation showing a coupling, according to one embodiment of the invention, separate from the valve and holder.
Figure 4:
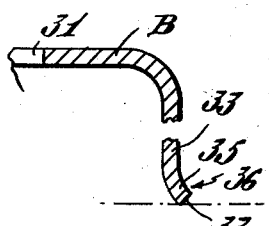
Fig. 4 is a fragmentary, vertical section substantially on the line 4—4 of Fig. 3, but to larger scale.

For securing the valve disc to the holder 20, a coupling C (Fig. 2) is provided in accordance with the present invention, this coupling, as here shown, being somewhat bell shaped or in the form of an inverted cup. This coupling is conveniently made of sheet metal such as may be shaped by the use of suitable dies and which, when completed, either by reason of the inherent characteristic of the material or as the result of heat treatment, subsequent to forming, is stiffly resilient. This coupling C (Figs. 2, 3 and 4) comprises the bottom or end portion B which is here shown as circular in contour (although it might be of other shape) and which is of a diameter somewhat exceeding that of the hub 25 of the valve but which is less in external diameter than the chamber 26 in the holder 20. This inverted, cup-like coupling C has the side wall S (Fig. 2) which is generally cylindrical and which is integral with the bottom or end B and which is provided with a plurality of slots 32 extending upwardly from its lower edge, as viewed in Fig. 2, nearly to the end or bottom member B. These slots 32 are desirably spaced uniformly apart circumferentially and divide the wall S into a plurality of legs 33. The lower portions of these legs 33, as viewed in Fig. 2, are flared outwardly at 35 so that the extreme lower edges of the legs collectively define a circle of a diameter exceeding that of the entrance passage 28 in the holder. The outwardly and downwardly inclined outer surface 36 (Fig. 4) of the flared, lower portion of the leg is designed to co-operate with the cam surface 30 of the holder, above described, during the operation of inserting the coupling into the holder, as hereafter described, while the lower end of the leg 33 is designed to abut the upper sloping surface 29 of the rib 27 when the parts are assembled so as to retain the parts in operative position.

Figure 5:
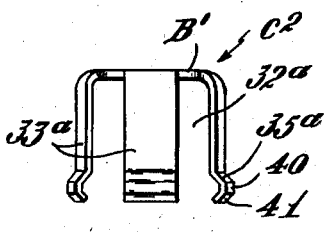
Fig. 5 is a view similar to Fig. 2, but illustrating a modified form of coupling.
Figure 3:
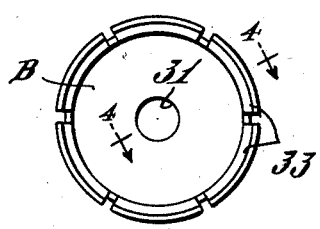
Fig. 3 is a bottom view of the coupling shown in Fig. 2.
Figure 6:
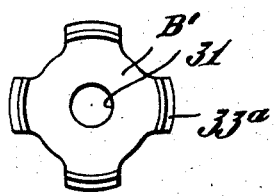
Fig. 6 is a bottom view of the coupling shown in Fig. 5.

The coupling C, above described and illustrated in Figs. 2 and 3, has its side wall S so slotted as to provide six of the legs 33. However, the number of legs employed may be varied as desired depending, among other things, on the material employed, the size of the valve, and the amount of force available to withdraw the valve from the holder. Thus, in Figs. 5 and 6, there is illustrated a coupling $C^2$, generally similar to that of Figs. 2 and 3, but in which there are only four of the legs $33^a$ extending downwardly from the bottom or end member B'. As shown in Fig. 5, the lower end of each leg is so bent as to provide the outwardly and downwardly sloping face $35^a$ for contact with the cam surface 30 of the holder; the vertical intermediate portion 40 and the inwardly and downwardly sloping portion 41, the latter co-operating with the upper sloping surface 29 of the holder, for retaining the parts in assembled relation.

Figure 9:
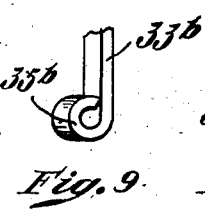
Figures 10, 11:
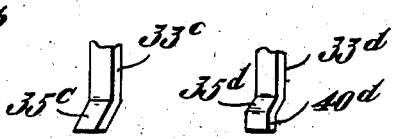

Legs having terminal portions of other shapes are shown in Figs. 9, 10 and 11. Thus, in Fig. 9, the end portion of the leg $33^b$ is curled to provide a substantially cylindrical end $35^b$. In Fig. 10, the leg $33^c$ is shown as having a single downwardly and outwardly sloping member providing the surface $35^c$ for engagement with the cam surface 30 of the holder; while in the arrangement of Fig. 11, the leg $33^d$ has an outwardly and downwardly sloping portion $35^d$ followed by a vertical terminal portion $40^d$.

Valves of this type are sometimes of large dimensions so that the valve disc is quite heavy thus necessitating the employment of a coupling capable of supporting a very substantial load. Since the coupling, in accordance with the present invention, supports the load by means of the resilient legs 33 whose tips rest on the sloping surface 29, it is obviously a requisite that these legs be of sufficient stiffness, when the parts are assembled, to support the load without buckling. On the other hand, it has been found that if a coupling, consisting of a single cup, such as that shown in Figs. 2 and 3 for example, be made of material which is sufficiently stiff and rigid to support a heavy load, the operation of forcing this coupling through the restricted passage 28 may impose such stress on the material of the coupling as to exceed the elastic limit of the material so that the legs become permanently deformed.

Figure 7:
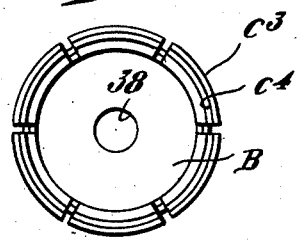
Fig. 7 is a bottom view of a coupling such as that illustrated in Fig. 1.

As a means for avoiding this difficulty, a coupling, such as that illustrated in Figs. 1 and 7, may be employed. This coupling comprises two of the cup-like members, such as the coupling C shown in Fig. 2, nested, one within the other, these nested cups being indicated by the characters $C^3$ and $C^4$ of Figs. 1 and 7, these members $C^3$ and $C^4$ being of such relative dimensions that one may fit snugly one within the other and being so arranged that their corresponding legs register with each other. Such an arrangement, providing two separate thicknesses of the material may be made to afford the desired stiffness and strength to support a heavy load; but, on the other hand, because corresponding legs of the inner and outer cups are separate and capable of relative sliding motion, the composite leg is much more flexible than a leg of the same collective thickness but of a unitary piece of material. While two nested cups have been suggested, it is clear that a great number of cups may be assembled together in a similar way if desired.

As shown in Fig. 1, the upper end of the hub 25 of the valve is provided with an integral axial boss 38 which is projected upwardly through the central opening in the coupling member and is then swedged to provide the head 39 whereby the valve is permanently and rigidly secured to the coupling. Obviously, other means for securing the valve disc to the coupling may be employed.

Assuming that the coupling has thus been secured to the valve in preparation for assembling the valve with the holder 20, the upper end of the coupling is pushed up through the cavity 21 in the holder and up through the lower portion of the passage 28 whose entrance is defined by the upwardly converging cam surface 30. As above noted, the external diameter of the body portion of the coupling is such that it may be passed up through the restricted entrance passage 28, whereas the lower flaring end portions of the legs are on a diameter such that they will not pass freely through the passage 28. By the application of suitable force to the underside of the valve disc, the lower extremities of the legs of the coupling may be forced inwardly by the action of the cam surface 30 upon the outer surfaces 36 of the legs until the lower ends of the legs pass up above the cylindrical passage 28, whereupon the lower portions of the legs resiliently expand so that their ends overlie the surface 29 of the holder, thus securely uniting the valve and holder. Since the lower tips of the legs of the coupling merely rest on the surface 29 and since, as shown in Fig. 1, the slope of the lower surface 37 (Fig. 4) of the leg is somewhat less steep than the slope of the surface 29, the contact between the legs and the surface 29 is but little more than a line-contact; and since the legs are somewhat resilient the valve is permitted to rock and thus properly seat itself upon the annular valve seat. The valve is also free to rotate about its own axis as the lower ends of the legs slide on the surface 29. This arrangement provides an adequate and reliable connection between the valve and holder and one such as greatly facilitates the assembly of the parts since no special tools are required for the purpose.

In order to make possible the removal of the valve from the holder when it is desired to do so, for instance to replace a worn valve, the present invention contemplates that the holder will be provided with diametrically opposite passages H (Fig. 1) extending inwardly to the cavity 21 and which are operative to admit drift pins D having inclined or cam-shaped end surfaces. By driving or forcing these pins inwardly so that their inclined cam surfaces engage the upper edge of the disc 26, the latter may be forced downwardly, such movement being permitted by the fact that the end surface 37 of the leg of the coupling slopes inwardly, as above described, at a lesser angle than the surface 29, thus responding to the downward force applied to the disc to flex the end of the leg inwardly until the end of the leg is able to enter and move downwardly through the passage 28. Thus, it is possible to remove the valve without injury to the holder or to the valve itself although in the normal operation of the valve device, the valve disc is securely and reliably united to the holder.

While certain desirable embodiments of the invention have herein been illustrated and described, by way of example, it is to be understood that the invention is broadly inclusive of any and all modifications falling within the scope of the appended claims.

I claim:

1. A coupling for releasably uniting two rigid parts, one of which is of a shape to define the wall of a circular chamber provided with a restricted entrance, said coupling being so constructed and dimensioned that the entire coupling may be passed through said restricted entrance into said chamber, the coupling comprising a unitary piece of stiffly resilient sheet material shaped to provide an end member and side wall, the side wall having slots therein which divide it to form a plurality of legs each of which is integrally joined at one end to the end member, the legs being otherwise free from each other, the end member and the major portion of the side wall of the coupling being capable of freely entering said chamber through said restricted entrance but the terminal portions of the legs being so outwardly flared that they can pass through said entrance only when said terminal portions have been flexed inwardly towards the axis of the coupling, the wall of the chamber comprising a downwardly convergent annular abutment surface whose lower edge defines the upper end of the entrance passage, the terminal portion of each leg having an end surface shaped for abutting engagement with said abutment surface of the wall of said chamber whereby the coupling is retained within the chamber when once entered therein but is free for rocking motion therein, and means for rigidly attaching the other of said parts to the end member of the coupling.

2. A coupling for releasably uniting two rigid parts, one of which is shaped to define the wall of a circular dead-end chamber having a restricted entrance passage defined by an annular ledge integral with the wall of the chamber, said ledge having an inner surface which slopes toward the entrance passage, the coupling comprising a unitary piece of stiffly resilient sheet material and being generally cup-like in shape having a circular end member and a generally cylindrical wall, the end member and the major portion of the cylindrical wall being of such diameter that they may pass freely through said entrance passage into said chamber, the wall of the coupling being slotted to divide it into a plurality of circumferentially spaced legs, the legs being outwardly flared at their lower portions to a diameter such that they cannot move through said restricted entrance passage except when they have been deflected inwardly towards the axis of the cup-like piece, each leg having an end surface shaped for abutting engagement with the sloping surface of the ledge whereby, when the cup-like piece has been fully entered into said chamber, it is normally retained therein, the second of said parts having an element which extends freely through said entrance passage and into the cup-like coupling piece, and means for permanently securing said element to the end member of the cup-like piece.

3. A coupling according to claim 2 wherein the ledge has an outer cam face which slopes inwardly towards the chamber, and the terminal portion of each leg of the cup-like piece has a surface engageable with said cam face, as the cup-like piece is moved into the entrance passage, thereby to flex the legs inwardly towards the axis of the cup-like piece to admit the cup-like piece to pass completely into said chamber.

4. A coupling according to claim 2 wherein the end face of each leg which makes abutting engagement with the sloping inner surface of the ledge is sloped inwardly toward the axis of the cup-like piece at an angle less steep than that of said inner surface of the ledge.

5. A coupling according to claim 2 wherein the end face of each leg, which makes abutting engagement with the slopping inner surface of the ledge, is so shaped as normally to oppose withdrawal of the cup-like piece from the chamber, but, in response to the application of sufficient forces will be cammed inwardly by such slopping surface of the ledge thereby to flex the leg inwardly and permit the cup-like piece to escape through the entrance passage.

6. In combination with a valve device of the kind wherein a valve disc has an axial hub and a holder has a cavity for housing the valve disc and an axial chamber at the inner end of the cavity for the reception of the hub, the chamber being permanently closed except for a restricted entrance passage whose inner end is defined by an annular ledge integral with the holder, a snap-action coupling for connecting the valve disc to the holder, said coupling being of inverted cup shape, having an end member and substantially cylindrical side wall, and being of stiffly resilient sheet material, the end member and major portion of the side wall of the cup being of an external diameter less than that of the entrance passage, the wall of the cup being slotted to divide it into a plurality of legs, each integrally joined to the end member of said coupling but which are otherwise free from each other, the terminal portions of the legs being outwardly flared to a diameter exceeding that of said entrance passage whereby said terminal portions of the legs must be flexed inwardly to permit the cup to enter said passage, each leg having the end for free abutting engagement with an inner surface of the ledge whereby the coupling is free to rock within the chamber, and means rigidly securing the valve disc to the end member of the cup.

7. The combination according to claim 6 wherein the inner surface of the ledge which the ends of the legs abut, slopes inwardly toward the inner end of the entrance passage and wherein the axial depth of the passage, relatively to the lengths of the legs of the coupling, is such that when the entire coupling has passed through the restricted entrance passage, the ends of the legs of the coupling rest loosely in contact with said inner sloping surface of the ledge.

8. A combination according to claim 6 wherein the entrance passage is cylindrical and the ledge which defines the entrance passage has an outer annular cam surface which slopes inwardly toward the outer end of the entrance passage and the terminal portion of each leg has an inclined external face engageable with said cam surface as the coupling is moved into the passage thereby to flex the leg inwardly.

9. The combination according to claim 6 wherein the holder has diametrically opposed holes leading into the cavity which houses the valve disc through which drift pins may be inserted for applying force to the valve disc sufficient to deflect the ends of the legs of the coupling inwardly until they escape from the ledge.

10. The combination according to claim 6 wherein the coupling comprises a plurality of the cup-like members nested together with their respective legs in registry thereby to provide the requisite strength to support a heavy valve disc while preserving sufficient resiliency to enable the coupling to pass through the entrance passage without taking a permanent set.

11. A coupling for releasably uniting rigid parts while permitting one of said parts to rock and rotate relatively to the other, one of said parts having an internal chamber permanently closed except for an entrance passage whose transverse dimensions are less than those of the chamber, and the other of said parts comprising a main portion whose transverse dimensions exceed those of said passage and an integral rigid stem of such transverse dimensions that it may pass freely, with clearance, through said entrance passage and which is of a length such that when the parts are assembled, it extends through the passage and substantially to the inner end of said chamber, the chamber having a centrally apertured floor, the coupling comprising a bell-shaped member having an end portion which is rigidly secured to the end of said stem and whose transverse dimensions are such that it may be entered freely into the chamber through said passage, said bell-shaped member also comprising a plurality of stiffly resilient legs which, when the parts are assembled, extend from said end portion toward the entrance passage and whose free end portions flare outwardly away from the stem to an extent such that they must be flexed inwardly toward the stem in introducing the bell-shaped member into said chamber, the length of the legs of said bell-shaped member being such that the bell-shaped member, as a whole, may be housed within the chamber with the extreme ends of its legs resting loosely upon said centrally apertured floor of the chamber.

12. A coupling, according to claim 11, wherein the coupling member comprises two of the said bell-shaped members arranged in nested relation with their corresponding legs in registry and with the end member of one superposed on that of the other, and means rigidly connecting both of said end members to said stem, and wherein the apertured floor of the chamber converges inwardly toward the inner end of the passage and the chambered member has a cam surace which converges toward the entrance end of said passage.

13. A coupling, according to claim 11, wherein the bell-shaped coupling member consists of a unitary piece of stiffly resilient sheet material shaped to provide an approximately circular end portion and a plurality of circumferentially spaced legs, the major portion of each leg being substantially perpendicular to the plane of the end member, each leg having a surface near its free end which inclines outwardly and downwardly with reference to the axis of the coupling.

References Cited in the file of this patent

UNITED STATES PATENTS

| | | |
|---|---|---|
| 861,573 | Budd | July 30, 1907 |
| 1,320,446 | Clark | Nov. 4, 1919 |
| 2,133,871 | Reed | Oct. 18, 1938 |
| 2,159,363 | Chaffee | May 23, 1939 |
| 2,710,163 | Mueller | June 7, 1955 |